(12) United States Patent
Powers et al.

(10) Patent No.: US 6,342,386 B1
(45) Date of Patent: *Jan. 29, 2002

(54) METHODS FOR REMOVING UNDESIRED GROWTH FROM A SURFACE

(76) Inventors: Warren Paul Powers, 4949 Mariners Point Dr., Jacksonville, FL (US) 32225; Thomas Allan Selvig, 3080 Cortez Rd., Jacksonville, FL (US) 32246; Richard Irwin Leavitt, 404 LaReserve Cir. Dr., Ponte Vedra Beach, FL (US) 32082

(*) Notice: Subject to any disclaimer, the term of this patent is extended or adjusted under 35 U.S.C. 154(b) by 0 days.

This patent is subject to a terminal disclaimer.

(21) Appl. No.: 09/346,535

(22) Filed: Jul. 2, 1999

Related U.S. Application Data

(63) Continuation of application No. 08/739,272, filed on Oct. 29, 1996, now Pat. No. 5,919,689.

(51) Int. Cl.[7] .................... A01N 63/00; A61K 38/43; B09B 3/00; C12N 1/00; D06M 16/00

(52) U.S. Cl. ............... 435/262; 424/93.1; 424/94.1; 424/94.2; 435/243; 435/262.5; 435/264; 435/821

(58) Field of Search ................ 435/262.5, 183, 435/822, 243, 262, 264, 821; 424/93.1, 94.1, 94.2

(56) References Cited

U.S. PATENT DOCUMENTS

| | | | |
|---|---|---|---|
| 2,997,471 A | 8/1961 | Cheney et al. | 544/154 |
| 3,616,229 A | 10/1971 | Wildi et al. | 435/175 |
| 3,773,623 A | 11/1973 | Hatcher et al. | 424/115 |
| 3,824,184 A | 7/1974 | Hatcher et al. | 424/94.61 |
| 3,857,934 A | 12/1974 | Bernstein et al. | 424/412 |
| 4,055,467 A | 10/1977 | Christensen et al. | 435/264 |
| 4,104,234 A | 8/1978 | Bednarski et al. | 523/117 |
| 4,121,034 A | 10/1978 | Bednarski et al. | 526/240 |
| 4,297,137 A | 10/1981 | Sachetto et al. | 514/493 |
| 4,357,142 A | 11/1982 | Schall, Jr. | 436/531 |
| 4,363,634 A | 12/1982 | Schall, Jr. | 436/527 |
| 4,410,676 A | 10/1983 | Keller | 528/9 |
| 4,552,813 A | 11/1985 | Grams | 428/411.1 |
| 4,614,549 A | 9/1986 | Ogunbiyi et al. | 134/19 |
| 4,684,469 A | 8/1987 | Pedersen et al. | 424/94.4 |
| 4,886,664 A | 12/1989 | Jung et al. | 424/93.4 |
| 4,911,981 A | 3/1990 | Schnur et al. | 428/402.24 |
| 4,936,994 A | 6/1990 | Wiatr | 210/632 |
| 4,994,390 A | 2/1991 | Wiatr | 435/262 |
| 5,037,758 A | 8/1991 | Mulligan et al. | 435/252.5 |
| 5,071,764 A | 12/1991 | Wiatr | 435/264 |
| 5,143,545 A | 9/1992 | Stiffey et al. | 106/15.05 |
| 5,154,747 A | 10/1992 | Yokoi et al. | 524/590 |
| 5,192,667 A | 3/1993 | Stiffey | 435/32 |
| 5,218,059 A | 6/1993 | Kishihara et al. | 525/477 |
| 5,281,357 A | 1/1994 | Morgan et al. | 510/393 |
| 5,290,693 A | 3/1994 | Chen et al. | 435/182 |
| 5,324,649 A | 6/1994 | Arnold et al. | 435/187 |
| 5,328,846 A | 7/1994 | Wedler | 435/264 |
| 5,354,603 A | 10/1994 | Errede et al. | 442/361 |
| 5,411,666 A | 5/1995 | Hollis et al. | 210/632 |
| 5,492,696 A | 2/1996 | Price et al. | 424/417 |
| 5,510,178 A | 4/1996 | Olsen et al. | 428/323 |
| 5,526,138 A | 6/1996 | Bederke et al. | 386/121 |
| 5,629,085 A | 5/1997 | Ito et al. | 428/318.6 |
| 5,919,689 A | * 7/1999 | Selvig et al. | 435/202 |
| 5,998,200 A | * 12/1999 | Bonaventura et al. | 435/264 |

FOREIGN PATENT DOCUMENTS

| | | |
|---|---|---|
| CA | 739439 | 7/1966 |
| CA | 103187 | 3/1989 |
| EP | 0518445 A | * 12/1992 |
| EP | 0866103 | 9/1998 |
| FR | 2 562 554 A | 10/1985 |
| FR | 2 562 554 | 10/1985 |
| GB | 2306473 A | 6/1997 |
| JP | 63 202677 A | 8/1988 |
| JP | 363202677 | 8/1988 |
| JP | 01-163108 | 6/1989 |
| JP | 401230687 | 9/1989 |
| JP | 401331305 | 9/1989 |
| JP | 02227465 | 9/1990 |
| JP | 04-252284 | 9/1992 |
| JP | 404252284 | 9/1992 |
| JP | 04279677 A | * 10/1992 |
| JP | 04337369 | 11/1992 |
| JP | 10259347 | 9/1998 |
| SU | 1794795 | 2/1993 |
| WO | WO95/32862 | 7/1995 |
| WO | 9527009 | 10/1995 |
| WO | WO9527009 A | 10/1995 |
| WO | WO9638548 A | * 12/1996 |

OTHER PUBLICATIONS

Almendral et al., "Spectrophotometric Determination of L-Asparagine By Flow-Injection Analysis Using L-Asparaginase Immobilized On An Epoxy Resin," *Analytica Chemica Acta*, 308:170–177 (1995).

(List continued on next page.)

*Primary Examiner*—Michael G. Wityshyn
*Assistant Examiner*—Deborah K. Ware
(74) *Attorney, Agent, or Firm*—Finnegan, Henderson, Farabow, Garrett & Dunner, L.L.P.

(57) ABSTRACT

Disclosed are compositions and/or paints containing hydrolytic enzyme(s), microorganism(s), or mixtures of the hydrolytic enzyme(s) and microorganism(s), wherein the microorganism or hydrolytic enzyme remove undesired growth from a surface. Such compositions and/or paints may contain a catalytically effective amount of an inorganic salt. Also disclosed are articles coated with the composition and/or paint. Finally, methods are disclosed for reducing fouling of a marine surface, for reducing marine corrosion, for limiting absorption of water by a marine surface, for reducing the coefficient of drag of a marine surface, removing marine growth from a marine surface, and for reducing mildew fungus on a marine surface.

19 Claims, 4 Drawing Sheets

OTHER PUBLICATIONS

Gatenholm et al., "Toward Biological Antifouling Surface Coatings: Marine Bacteria Immobilized in Hydrogel Inhibit Barnacle Larvae," *Biofouling*, 8:293–301 (1995).

Holmstrom et al., "Inhibition of Settlement By Larvae Of Balanus amphitrite and Ciona intestinalis By a Surface–Colonizing Marine Bacterium," *Applied and Environmental Microbiology*, 58:2111–2115 (1992).

Kirchman et al., "Adsorption Of Proteins To Surfaces in Seawater," *Marine Chemistry*, 27:201–217 (1989).

Bakus et al., "Chemical Ecology of Marine Organisms: An Overview," *Jounral of Chemical Ecology*, 12:951–987 (1986).

Costerton et al., "How Bacteria Stick," *Scientific American*, 238:86–95 (1978).

Geesey et al., "Microscopic Examination Of Natural Sessile Bacterial Populations From An Alpine Stream," *Canadian Journal of Microbiology*, 23:1733–1736 (1977).

Danielsson et al., "On Bacterial Adhesion—The Effect of Certain Enzymes On Adhered Cells Of A Marine Pseudomonas sp.," *Botanica Marina*, XX:13–17 (1977).

Mitchell et al., "The Role Of Microorganisms in Marine Fouling," Office of Naval Research Technical Report No. 3 (1972).

Baier et al., "Adhesion: Mechanisms That Assist Or Impede It," *Science*, 162:1360–1368 (1968).

Zobell et al., "The Significance Of Marine Bacteria In The Fouling Of Submerged Surfaces," *J. Bacteriology*, 29:239–251 (1935).

D.J. Crisp, "Factors Influencing the Settlement of Marine Invertebrate Larvae," *Chemoreception in Marine Organism*, Eds. P.T. Grant and A.M. Mackie, NY: Academic Press, pp. 177–265 (1974).

"Maxamyl® CXT Encapsulated Amylolytic Enzyme Preparation," GENENCOR International, Inc. Product Brochure, 1995©.

"Maxamy® WL Liquid Amylolytic Enzyme," GENENCOR International, Inc. Product Brochure, 1995©.

"Purafect® 4000L Protease Enzyme for Liquid Detergents," GENENCOR International, Inc. Product Brochure, 1994©.

"Purafect® 2000G Protease Enzyme for Powdered Detergents with Enzoguard™,"GENENCOR International, Inc. Product Brochure, 1993©.

Turtle Wax, Inc. Material Safety Data Sheet, May 17, 1996, Chicago, Ill.

GENENCOR International, Inc. Material Safety Data Sheet, Jun. 7, 1995, Rochester, NY.

Catalyst Systems, Inc. Material Safety Data Sheet, Sep. 1, 1992, Gnadenhutten, OH.

Clear Coat Corp. Material Safety Data Sheet, Jan. 9, 1991, St. Petersburg, FL.

Petit Paint Co., Inc. Material Safety Data Sheet, May 18, 1989, Borough of Rockaway, NJ.

Pettit Paint Co., Inc. Material Safety Data sheet, May 17, 1989, Borough of Rockaway, NJ.

Pettit Paint Co., Inc. Material Safety Data Sheet, May 17, 1980, Borough of Rockaway, NJ.

Howe Laboratories, Inc., Material Safety Data Sheet, Dec. 4, 1995, Eden, NY.

Marshall et al., "Mechanism of Intital Events in the Sorption of Marine Bacteria to Surfaces," *Journal of General Microbiology*, 68:337–348 (1971).

Kobayashi et al., "Haloalkiphilic Maltotriose–Forming Alpha–Amylase from the Archaebacterium Natronococcus sp. Strain Ah–36," *J. Bacteriology*, 174:3439–3444 (1992).

Progress Report Abstracts, Microbiology Program, Office of Naval Research (1972).

Cheung et al., "Studies on the Biogenesis and Chemistry of the Adhesive Substance Secreted by the Cyprid and Metamorphosed Stages of the Barnacle—'Blanus'," Prepared For Office of Naval Research by Osborn Laboratories of Marine Science, New York Aquarium, New York Zoological Soc. (1974).

Michelle et al., "Negative Chemotaxis: A New Approach To Marine Fouling Control," Technical Report No. 1, Prepared For Office of Naval Research by the Division of Engineering and Applied Physics, Harvard University (1975).

Mitchell et al., "Microbial Processes Associated With Control of Marine Fouling and Boring Organisms," Technical Report No. 2, Prepared For Office of Naval Research by the Division of Engineering and Applied Physics, Harvard University (1976).

Garchakov et al., "Succession of Periphytic Microorganisms on Metal and Glass Surfaces in Natural Seawater,"Prepared For Office of Naval Research by the Dept. of Microbiology, Miani University (1976).

E.C. Haderlie, Office of Naval Research Branch London, ONR London Conference Report, Fourth International Biodeterioration Symposium, West Berlin, Germany (1978).

Green et al., "Oceanic Chemistry and Biology Group (ONR Code 422CB) Program Science Report," Office of Naval Research (1982).

Fornalik et al., "Mitigation of Biofouling Using Coatings," Year 3 Annual Report/Final Report, Calspan Report No. 6782–M–12 (1983).

Melton et al., "Molecular Biology of Marine Microorganisms: Biotechnological Approaches to Naval Problems," Naval Research Reviews, 40:24–39 (1989).

"Molecular Specificity of Adsorption of Biofilm Macromolecules and Microbial Biofouling on Artificial Surfaces in the Sea," Annual Report Prepared for the Office of Naval Research by Dept. of Marine Science, University of Puerto Rico (1989).

"Protein Adsorption and its Role in Bacterial Film Development," Yearly Progress Report Prepared for the Office of Naval Research by the College of Marine Studies, University of Delaware (1989).

Wagner et al., "An Electrochemical Evaluation of Copper Colonized by a Copper–Tolerant Marine Bacterium," Corrosion 91, The NACE Annual Conference and Corrosion Show Paper No. 109, Cincinnati, Ohio (1991).

Little et al., "An Experimental Evaluation of Titanium's Resistance to Microbiology Influenced Corrosion," Corrosion 92, The NACE Annual Conference and Corrosion Show Paper No. 173 (1992).

David L. Kirchman, "Regulation of Attached Bacterial Growth by Adsorbed Proteins," Prepared For Office of Naval Research by College of Marine Studies, University of Delaware (1993), Abst. only.

"In situ Bio–Emulsifier Cleaning of Oil/Water Separators," and "Antibiofouling Technology—Biocorrosion," Accomplishments 1995 Naval Research Reviews, 48 (1995).

Andreyuk et al., "Microflora of the antifouling coating XB–5153 used under marine conditions", Mikrobiol. ZH (Kiev) (1985) 47(4):3–6 (1985) (abstract only).

Webster's New Riverside Dictionary (1994) (Riverside Publisig Co.: Boston) p. 1053 (1994).

Office of Naval Research publication, "50$^{th}$ Anniversary" edition, pp. 30–37 (1996).

Sjogren, John C. et al., "Inactivation of Phage MS2 by Iron–Aided Titanium Dioxide Photocatalysis," *Applied and Environmental Microbiology*, 60(1):344–437 (1994).

Wel, Cheng et al., "Bactericidal Activity of TIO2 Photocatalyst in Aqueous Media: Toward a Solar–Assisted Water Disinfection System," *Environ. Sci. Technol.* 28:934–938 (1994).

Ireland, John C. et al., "Inactivation of Escherichia coli by Titanium Dioxide Photocatalytic Oxidiation," *Applied and Environmental Microbiology*, 59(5): 1668–1670 (1993).

* cited by examiner

METHODS FOR REMOVING UNDESIRED GROWTH FROM A SURFACE

This is a continuation of application Ser. No. 08/739,272, filed Oct. 29, 1996, now U.S. Pat. No. 5,919,689 which is incorporated herein by reference.

BACKGROUND OF THE INVENTION

The present invention relates to marine antifouling methods, paints and compositions.

Marine fouling has plagued human beings since their first interaction with the marine environment. Marine fouling, which is the undesirable attachment of organisms to a marine surface, occurs not only on marine vessels such as ship's hulls and drive systems, but also on other structures exposed to sea water. Such structures may include: pilings, marine markers, undersea conveyances like cabling and pipes, bulkheads, cooling towers, and any device or structure that operates submerged.

Fouling is dependent upon a number of factors including light, substrate configuration and characteristics, water flow, chemical factors, biological complexity of the larva, the density and make-up of the larval community, and the presence or absence of surface films.

Surface films on marine surfaces are of great interest, because the great majority of marine larvae settle more readily on filmed surfaces. D. J. Crisp, *Chemosorbtion in Marine Organisms: Factors Influencing the Settlement of Marine Invertebrate Larvae* 177, 215 (1974) (ed. P. T. Grant & A. M. Mackie). Such surface films on marine structures are generated by marine microbes almost immediately upon the structure's entry into the water. D. Kirchman et al., Mar. Chem. 27:201–17 (1989).

These microbes act to stimulate further development of fouling organisms. C. E. Zobell and E. C. Allen, *The Significance of Marine Bacteria in the Fouling of Submerged Surfaces,* J. Bact. 29:230–51 (1935). In fact, investigators have found what appears to be a strong correlation between a primary film formation and attachment of animals to marine surfaces. R. Mitchell & L. Young, *The Role of Microorganisms in Marine Fouling,* Technical Report No. 3 V.S. Office of Naval Research Contract No. N00014-67-A-0298-0026 NR-306-025 (1972).

The surface films may include extracellular carbohydrates and proteins exuded by the marine microorganisms, which may be used to attach the microorganisms themselves to a marine surface. A. Danielsson et al., *On Bacterial Adhesion—the effect of certain enzymes on adhered cells of a marine Pseudomonas* sp., Botanica Marina 20:13–17 (1977); G. G. Geesey et al., *Microscopic Examination of Natural Sessil Bacterial Populations from an Alpine Stream,* Can. J. Microbio. 23:1733–36 (1977). Protein adsorption onto surfaces may have a substantial impact on microbial, chemical, and biogeochemical processes occurring at seawater-surface interfaces. D. L. Kirchman, et al., *Adsorption of Proteins to Surfaces in Seawater,* Marine Chemistry 27:201–217 (1989). Such attachment provides a microorganism advantages in that it can receive a constantly renewed supply of organic nutrients within physical conditions that are conducive to growth. J. W. Costerton et al., *How Bacteria Stick,* Scientific American 238:86–95 (1977).

However, fouling (i.e. undesirable attachment of organisms to a marine surface) creates many problems. Fouling results in increased drag, weight and corrosion for marine structures; decreased aesthetic appearance of the marine structure; and increased maintenance costs associated with removal of the fouling and repair of the structure. Further, even a small number of barnacles or equivalent organisms attaching themselves to the propellers of a boat can significantly reduce the propellers' efficiency or create cavitation problems.

The marine industry has attempted to reduce fouling by adding various toxic materials, such as mercury, tin and copper, to the coatings of vessels and structures. However, there are significant environmental problems with the use of these additives. The coatings containing the additives are usually formulated to expose the toxic materials embedded within the coating structure to the environment. It is this exposure that allows the toxic materials to leach into the marine environment, thus reducing attachment by the crustaceans.

However, the toxic nature of the materials is a double-edged sword; these additives have a generally adverse effect upon the marine environment, beyond simply reducing attachment by the crustaceans. Because of environmental concerns associated with the use of such additives, the U.S. Environmental Protection Agency (EPA) has significantly restricted the continued use of these compounds, particularly tin and mercury. In addition, even where the use of these additives is permitted, the additives are expensive to use, requiring frequent refurbishment (in some regions as frequently as every six months). Thus, these toxic additives are costly in terms of both resources and damage to the environment. Moreover, the marine organisms that attach to the underwater surface can acquire an immunity to the toxic materials and effectively render the materials impotent.

In light of the foregoing, there is a need for marine antifouling methods and compositions that do not use toxic additives in such a way as to substantially harm the environment. After much experimentation, the inventors developed the idea of incorporating, into marine coatings, hydrolytic enzymes and/or microorganisms whose function is to limit undesirable marine fouling.

The inventors' approach offers significant advantages over previous attempts to solve marine fouling problems. For example, the inventive method relies on hydrolytic enzymes and/or living cells to prevent biofouling. Thus, the coatings of this invention can be formulated so as not to contain an appreciable amount of toxic materials (such as heavy metals), and still retain their efficacy. This avoids the environmental concerns associated with the use of heavy metal biocides.

In these embodiments of the invention, microorganisms and/or hydrolytic enzymes are embedded in marine stable coatings such as epoxy, polyurethane or other coating materials by simple mixing. The microorganisms and/or hydrolytic enzymes can be used on any surface to which the marine compositions and/or paints of the invention can bind (paddles, propellers, hulls, cooling towers, etc.). Therefore, a wide range of applications is available for the coatings and/or paints of the invention.

The use of microorganisms, in addition to use of hydrolytic enzymes, allows for further benefits. For instance, when the inventive composition and/or paint is inoculated with beneficial microorganisms, the microorganisms may excrete materials, such as additional hydrolytic enzymes, that augment the hydrolytic enzymes that may have been added to the coating and/or paint. This refurbishment may continue in a robust fashion for the life expectancy of the composition and/or paint or until the microorganism population disintegrates in the marine environment. Alternatively, the beneficial microorganisms may outcompete fouling organisms on the marine surface, thus reducing fouling.

SUMMARY OF THE INVENTION

Accordingly, the present invention is directed to methods, compositions and paints that substantially obviate one or more of the above-mentioned problems.

To achieve these and other advantages and in accordance with the purpose of the invention, as embodied and broadly described, the present invention is directed to a marine antifouling composition comprising at least one microorganism or a mixture of an amylolytic or proteolytic enzyme and the microorganism, wherein the enzyme or the microorganism or the mixture reduces or prevents fouling of a marine surface coated with the marine antifouling composition.

The invention is further directed to: a marine antifouling paint comprising a paint composition, suitable for marine applications; and at least one microorganism or a mixture of an amylolytic or proteolytic enzyme and the microorganism, wherein the enzyme or the microorganism or the mixture reduces or prevents fouling of a marine surface coated with the marine antifouling paint.

The invention is also directed to methods of reducing fouling of a marine surface, articles coated with the antifouling composition or antifouling paint, methods for reducing marine corrosion, and methods for limiting absorption of water by a marine surface.

In another aspect of the invention, methods are disclosed for removing marine growth from a marine surface, for reducing the tendency of a propeller to cavitate under a load, and for reducing mildew fungus on a marine surface.

In yet another aspect of the invention, marine antifouling compositions and paint are disclosed that comprise an inorganic salt present in a catalytically effective amount.

DETAILED DESCRIPTION OF THE INVENTION

Figure 1:
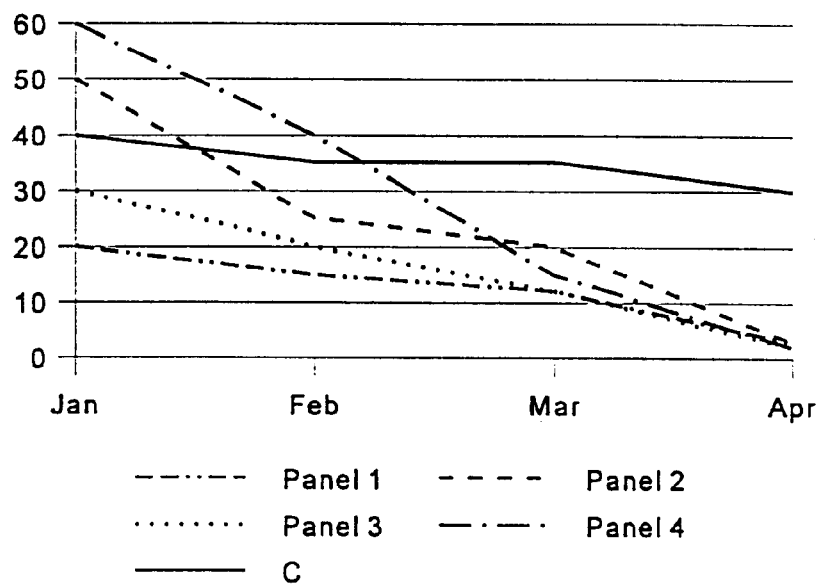
FIG. 1. is a plot of test results for upper tier panels 1–and control having coatings according to the invention.

The present invention is directed to a marine antifouling composition comprising at least one microorganism or a mixture of an amylolytic or proteolytic enzyme and the microorganism, wherein the enzyme or the microorganism or the mixture reduces or prevents fouling of a marine surface coated with the marine antifouling composition. The invention is also directed to a marine article coated with the composition, and a method for reducing fouling of a marine surface, comprising the step of coating the marine surface with the composition, wherein the composition reduces fouling of a marine surface coated with the marine antifouling composition.

Another aspect of the invention is a marine antifouling paint comprising a paint composition, suitable for marine applications; and at least one microorganism or a mixture of an amylolytic or proteolytic enzyme and the microorganism, wherein the enzyme or the microorganism or the mixture reduces or prevents fouling of a marine surface coated with the marine antifouling paint. The invention is also directed to a marine article coated with the paint, and a method for reducing fouling of a marine surface, comprising the step of coating the marine surface with the paint, wherein the paint reduces fouling of the marine surface coated with the paint.

In another embodiment of the invention, a method is disclosed for reducing marine corrosion comprising the step of coating a marine surface with a marine antifouling composition, whereby the composition forms at least one film that reduces adsorption of corrosive molecules to the surface. Also disclosed is a method wherein the composition impedes surface corrosion and intergranular corrosion.

Another embodiment of the invention is a method for reducing marine corrosion comprising the step of coating a marine surface with a marine antifouling paint, whereby the paint forms at least one film that reduces adsorption of corrosive molecules to the surface. In yet another aspect of the claimed invention, a method is disclosed, wherein the paint impedes surface corrosion and intergranular corrosion.

Yet another embodiment of the invention is a method for limiting absorption of water by a marine surface comprising the step of coating the surface with a marine antifouling composition or marine antifouling paint, whereby the composition or paint produces a film which in turn reduces the porosity of the surface.

In another aspect of the invention, a method is disclosed for reducing the coefficient of drag of a marine surface comprising the step of coating the surface with a marine antifouling composition or marine antifouling paint. The invention is also directed to methods of using the marine antifouling composition or marine antifouling paint wherein surfactants capable of acting as wetting agents are produced by the microorganisms in the composition or paint.

An aspect of the invention is a method for removing marine growth from a marine surface, comprising the step of coating the surface with a marine antifouling composition or marine antifouling paint. Another aspect of the invention is a method of using the marine antifouling composition or marine antifouling paint wherein the marine growth is hard or soft growth. Yet another aspect of the invention is a method of using the marine antifouling composition or marine antifouling paint, wherein the hydrolytic enzyme or the microorganism or the mixture attacks exudates of existing growths and causes release of hard and soft growth.

In another aspect of the invention, marine antifouling compositions or marine antifouling paints are disclosed that comprise an inorganic salt present in a catalytically effective amount. Yet another aspect of the invention is a method of reducing the tendency of a propeller to cavitate under a load, comprising the step of coating a surface of the propeller with a marine antifouling composition or marine antifouling paint. Still another aspect of the invention is a method of using a marine antifouling composition for reducing mildew fungus on a marine surface, comprising the step of coating a marine surface with a marine antifouling composition, whereby the composition forms at least one film that reduces the adsorption or attachment of mildew fungus to the surface, or impedes the growth of mildew fungus on the marine surface.

Reference will now be made in detail to the present preferred embodiments of the invention, examples of which are disclosed below.

The inventive protective coatings and/or paints containing microorganisms and/or hydrolytic enzymes may act in many ways. One possible mechanism of action for the present invention is that populations of innocuous microorganisms may be applied as part of a coating. Such innocuous microorganisms can be selected to "out compete" unwanted organisms, thus reducing fouling. Such innocuous microorganisms may act by potentially selectively removing critical nutrients, such as organic compounds or food source microorganisms, from the micro film of water on the marine structure's surface. Alternatively, such microorganisms may act by exuding antibiotics or other compounds to retard the growth of fouling organisms. In such fashion, these innocuous microorganisms would effectively reduce the growth of the fouling microorganisms (such as mildew), and further colonization by marine larvae.

The coatings and/or paints may also function by direct attack on the surface film, disrupting its polymeric structure through hydrolysis of the proteins and polysaccharides of the film. This would interrupt the chain of events that ultimately leads to the accumulation of large amounts of marine organisms (including bacteria, fungi, barnacles, etc.) on the hull of the ship. Such attack may be accomplished by the use of extracellular enzymes that disrupt the carbohydrates and proteins that make up the surface film. The inventors have tested this mechanism by using skim milk and corn starch as model substrates to determine the activity of two key hydrolytic enzymes, protease and alpha-amylase. Alternatively, the coatings and/or paints may function by modifying the surface tension of the marine surface to which the coatings and/or paints have been applied. Such a change in the surface tension may disrupt the colonization of the surface by undesirable marine organisms.

This invention has utility against crustaceans and other marine hard growth, such as:

Tube Worms: polychaetes; phylum—Annelida; subclass—Eunicea; family—Serpulidae

Mussels: bivalves; phylum—Mollusca; subclass—Pteriomorphia; family—Mytilidae

Oysters: bivalves; phylum—Mollusca; subclass—Pteriomorphia; family—Ostreidae

Clams: bivalves; phylum—Mollusca; subclass—Hterodonta; family—Veneridae

Bryozoans: bryozoans; phylum—Bryozoa; suborder—Anasca and Ascophora; genus—Schizoporella Barnacles: crustaceans; phylum—Arthropoda; subphylum—Crustacea The invention also has utility against soft growth, which can impede the efficiency of hull forms, damage substrates of marine structures, generally shorten the viable life span of equipment, and escalate the cost of operation. Examples of these soft growth forms include:

Algae (Botanus): Padina, and Codium

Bryozoans (Animal): Bugula Neretina

Hydroids (Animal): Obelia

Sabellids (Animal):

Delaya Marina (Marine Bacteria): Zibria

The methods and compositions disclosed herein may be used on a variety of surfaces, including but not limited to boat hulls, marine markers, bulkheads, pilings, water inlets, floors, roofs, and shingles. For example, the methods and compositions may be used to minimize fouling of marine markers. Such markers constitute a large category of floating objects and are greatly impaired by the accumulation of marine growth.

Similarly, the methods and compositions may be used on marine bulkheads. The accumulation of marine growth on bulkhead structures is detrimental to the bulkhead structure over the long term. Furthermore, the growth causes significant short term effects that are aesthetically displeasing and dangerous. Moreover, the harsh abrasive characteristics of the hard growth can result in major damage to vessels.

Similarly, the present invention can be used to minimize blockages due to fouling by marine growth of heat exchangers, evaporators, condensers and fire and flushing systems, thus resulting in significant decreases in maintenance costs for all categories of marine structures.

Compositions and/or paints according to the invention may include various hydrolytic enzymes, although it is possible to practice the invention without such hydrolytic enzymes. Examples of suitable enzymes include proteases, amylases, and other hydrolytic enzymes known in the art. The hydrolytic enzymes selected should act to prevent or reduce attachment by unwanted or undesirable marine organisms. The hydrolytic enzymes chosen should be able to survive and flourish in the marine environment to which they will be exposed.

Compositions and/or paints according to the invention may include various microorganisms, although it is possible to practice the invention without such microorganisms. Genera of suitable microorganisms include: Bacillus, Escherichia, Pseudomonas or other microorganisms known in the art. The microorganisms selected should act in a marine environment to prevent or reduce attachment by unwanted or undesirable marine organisms. The microorganisms chosen should be able to survive and flourish in the marine environment to which they will be exposed.

Compositions and/or paints according to the invention include the above-mentioned enzymes and/or microorganisms in an amount effective to reduce the growth of unwanted or undesirable microorganisms. Such compositions and/or paints may be in a variety of forms, including paints, lacquers, pastes, laminates, epoxies, resins, waxes, gels, and glues in addition to other forms known to one of skill in the art. The compositions and/or paints may be polymeric, oligomeric, monomeric, and may contain crosslinkers or cure promoters as needed. Such compositions and/or paints may contain other additives, in addition to those mentioned above, to accomplish purposes known to one of skill in the art. Such other additives include preservatives, pigments, dyes, fillers, surfactants, and other additives known to one of skill in the art.

Compositions and/or paints according to the invention may include a polymer resin base, although it is possible to practice the invention without such a base, or with a base of a different material. The compositions and/or paints may be applied as a single coating, or as multiple coatings.

Additionally, the inventors observed that the addition of some inorganic salts ($NaCl$, $CaCl_2$, $MgSO_4$, etc.) increased catalytic hydrolysis of both liquid and solid state (resin embedded) alpha-amylase (available from Genencor). While calcium chloride has been implicated as a cofactor in alpha-amylase catalyzed reactions, the amounts needed for activation (approximately 60 ppm) are considerably lower than the amount used in the epoxy resin formulations provided below in the Examples. Thus, it is possible to add such inorganic salts in a catalytically effective amount. The catalytically effective amount is greater than the amount of inorganic salt needed for activation. The catalytic effect has been explored more fully in Examples 7 and 8 below.

Various aspects of the invention will now be demonstrated in the Examples.

EXAMPLE 1

To demonstrate that enzymes encapsulated in a suitable marine coating or paint retain their enzymatic characteristics, a series of experiments was conducted. The substrates used to determine the activity of two key enzymes, proteases and the alpha-amylases, were skim milk and corn starch, respectively. As discussed above, these substrates each represented test substrates for the protein and polysaccharide portions of the target glycoprotein described as an initial element in the biofouling process.

Plastic or glass jars (100 ml capacity) were used as enzyme reactors. Enzymes were obtained from Genencor International, Inc. (Rochester, N.Y.). The enzymes tested were:

Desize 160 (alpha-amylase—liquid)

Maxamyl CXT 5000 (alpha-amylase—encapsulated)

Purafect 2000G—(Protease—encapsulated)

Maxamyl 15,000CXT—(alpha-amylase liquid)

In all assays the encapsulated enzymes were added directly to the indicated coatings. When the activity of the liquid enzymes was investigated, the enzymes were first added to calcium chloride. The calcium chloride was included as an absorbent in order to facilitate mixing with the coatings because water interfered with the hardening process. It was later found that the addition of calcium chloride ($CaCl_2$) and other salts resulted in increased amylolytic activity.

Proteolytic activity was determined using the following assay. Vinegar (dilute acetic acid) will precipitate milk protein from solution. The enzymatic hydrolysis of milk protein was therefore monitored by exposing a solution of milk protein to a protease and adding acetic acid to pulled samples over the course of time. The reduction in the amount of precipitate was then a measure of the activity of the enzyme and was expressed as percent hydrolysis.

Unless otherwise noted, assay of enzymatic activity was accomplished by the addition of 25 ml of a 1:4 aqueous dilution of skim milk (diluted to contain 0.94% protein). Activity was quantitated by comparison to a control without enzyme or cells present. Sufficient acid was added to precipitate all of the protein present. The amount of precipitate compacted by settling was used as a volumetric measure of the amount of protein present in the milk solution before hydrolysis. Enzymatic activity was determined by comparing the amount of acid precipitable protein present before and after exposure to the indicated enzymes or cells. The absence of acid precipitable protein was taken to indicate 100% hydrolysis by the added enzyme.

Amylolytic enzyme activity was determined by the addition of a suspension of corn starch in water, mixed to achieve a viscosity approaching solidification (12 grams/10 ml water). The water and starch were added to alpha-amylase suspended in either water or embedded into solidified epoxy resins. A reaction that resulted in complete liquidization of the solidified starch suspension was designated as complete (100%) hydrolysis. In reactions where there was a reduction in viscosity due to the addition of an alpha-amylase, activity was approximated by the degree of resistance to a hand-stirred paddle. Although these measurements of activity were subjective, they were reproducible relative to a standard control, such as a sample containing water and starch without enzyme present.

400 mg of encapsulated protease (Purafect 2000G, available from Genencor International Inc., Rochester, N.Y.) was mixed with a 2-inch ribbon of epoxy and hardener (2,4,6 tri(dimethylaminomethyl) phenol, available from ITW Brands, Woodale, Ill.). The resin/enzyme mixtures were used to coat the inside bottom of plastic bottles having a liquid capacity of 100 ml and a diameter of 2 inches (50 mm). The mixtures were allowed to harden for 16 hours. Diluted skim milk was added to the reactors, as set forth in Table 1, and incubated at room temperature for 5 hours. Samples were removed and examined for proteolytic activity by the addition of dilute acetic acid to precipitate the unhydrolyzed protein.

TABLE 1

| Test Mixture | % Hydrolysis |
| --- | --- |
| Epoxy alone | 0 |
| Epoxy + Purafect 2000G (encapsulated protease) | 100 |

Thus, the encapsulated protease (Purafect 2000G) retains its enzymatic activity after being embedded in an epoxy resin glue.

EXAMPLE 2

The enzymatic activity of embedded protease (Purafect 2000 G) was again determined according to the procedure of Example 1, except that sea water was substituted for tap water as the diluent for the skim milk. Results identical to Example 1 were obtained. Thus, substituting sea water for tap water had no effect on the activity of the proteolytic enzyme encased in epoxy resin.

EXAMPLE 3

A ½" (12.5 mm) diameter plastic bead was coated with the epoxy/enzyme mixture according to Example 1. Skim milk diluted to contain 0.2% protein was added to each reaction vessel. After 4 hours of incubation at ambient temperature, samples were removed and dilute acetic acid added to precipitate the unhydrolyzed milk protein. The results were as follows:

TABLE 2

| Test Material | % Hydrolysis |
| --- | --- |
| Control (no enzyme) | 0 |
| Epoxy & Purafect 2000G (encapsulated protease) | 100 |
| Purafect 2000G (encapsulated protease) coated bead | 80 |

Thus, reactors containing either an coat of epoxy/enzyme on the bottom inner surface or a enzyme coated bead showed evidence of complete or nearly complete protein hydrolysis.

EXAMPLE 4

An enzyme reactor prepared according to Example 1 by coating the bottom inner surface of a plastic jar with epoxy/enzyme (protease) was tested for hydrolytic activity 24 hours and 28 days after its preparation to examine its stability with time.

The results are given in Table 3, below.

TABLE 3

| Test Material | % Hydrolysis |
| --- | --- |
| Control (no enzyme) | 0 |
| Epoxy & Purafect 2000G (encapsulated protease) (24 hours) | 100 |
| Epoxy & Purafect 2000G (encapsulated protease) (28 hours) | 80 |

The epoxy & enzyme was still active after 28 days at ambient temperature with only a slight loss in activity.

EXAMPLE 5

Other resins were examined as alternatives to the Devcon epoxy used previously.

| | |
|---|---|
| 1) PC-11 | Heavy duty epoxy resin glue available from Protective Painting Company |
| 2) Polypoxy | epoxy resin composition (Underwater patching compound 7055 available from Pettit Paint Company, Rockaway, NJ) |
| 3) Gel-Coat | polyester resin composition White Gel Coat available from Clear Coat Corp., FL) |
| 4) Bondo | Polyester resin & fiberglass material (available from Dynatron/Bondo Corporation) |

All resin/enzyme mixtures were prepared as described in Example 1 and 100 mg of Purafect 2000G (encapsulated protease) was used as a source of the proteolytic enzyme. After 2 hours, a sample was removed from each reactor mixture. Percent hydrolysis was determined as described in Example 1. The results are listed in Table 4, below.

TABLE 4

| Test Material | % Hydrolysis |
|---|---|
| Control (no epoxy or enzyme) | 0 |
| PC-11 (epoxy resin glue) | 70 |
| Polypoxy (epoxy resin) | 90 |
| Gel-Coat (polyester resin) | 50 |
| Fiberglass | 95 |

EXAMPLE 6

Liquid enzymes were studied as constituents of enzyme-resin formulations. In previous experiments, only proteolysis was considered as a means of hydrolyzing the glycoprotein believed to be the primary agent in the biofouling process. In this experiment, both proteolytic and amylolytic enzymes were examined. Purafect 4000L (proteases) (0.5 ml) or Desize 160 (Alpha-amylase liquid) (0.5 ml) were first added to 4.0 grams of $CaCl_2$ before being mixed with Devcon's 5 Minute Epoxy in order to reduce the amount of free water added with the enzymes. Free water interferes with the solidification of the epoxy resin under investigation.

A starch suspension was added to reaction vessels number 2 and 4. Diluted milk was added to reaction vessels 1 and 3. After 2 hours incubation at ambient temperature the degree of hydrolysis of each mixture was observed, according to the methods given in Example 1. The compositions and results are listed in Table 5, below.

TABLE 5

| | Test Material | | Results | |
|---|---|---|---|---|
| Reaction Vessel | Epoxy Protease | Epoxy Amylase | % Starch Hydrolysis | % Milk Hydrolysis |
| 1 | — | — | — | 0 |
| 2 | — | — | 0 | — |
| 3 | + | — | — | 100 |
| 4 | — | + | 100 | — |

The reaction mixture in Reaction Vessel 3 clarified and was unreactive to the addition of dilute acetic acid indicating complete hydrolysis of the milk protein by the $CaCl_2$ absorbed enzyme/resin formulation. The reaction mixture containing $CaCl_2$ and water was heavily viscous and difficult to pour. The mixture containing the enzyme resin was watery thin and poured easily. In each case the liquid enzymes proved amenable to use in the epoxy resin formulation. Both starch and protein were hydrolyzed by epoxy/liquid enzyme formulations. Hydrolysis of starch (polysaccharide) or protein was not interfered with by the addition of calcium chloride to the enzyme resin formulation.

EXAMPLE 7

As discussed above, the effect of inorganic salt addition to the enzyme-epoxy resin formulation was investigated to examine what effect the salt had on the activity of alpha-amylase. This investigation was initially prompted by questions about the effect that the calcium chloride drying agent was having on enzyme reactivity. Calcium ion has been implicated in the activities of alpha-amylase, and it is known to function as a co-factor at concentrations of approximately 60 ppm. Accordingly the effect of calcium chloride addition on the activity of liquid alpha-amylase was examined.

Sample vessels were prepared according to the method of Example 1. 12 gms of starch were added to each vessel, together with water and calcium chloride as indicated below. The aqueous mixture was stirred to homogenize it. The % hydrolysis of the mixtures was determined as set forth in Example 1. The results are summarized in Table 6 below.

TABLE 6

| Vessel | $H_2O$ | $CaCl_2$ | (alpha-amylase) Desize 160 | % Hydrolysis |
|---|---|---|---|---|
| 1 | 10 ml | 0 | 0.5 ml | 10 |
| 2 | 10 ml | 1 gm | 0.5 ml | 80 |
| 3 | 10 ml | 2 gm | 0.5 ml | 80 |
| 4 | 10 ml | 4 gm | 0.5 ml | 90 |
| 5 | 10 ml | 8 gm | 0.5 ml | 0* |

*An excess of calcium chloride produces an elastic soft and moldable polymer. This was taken to indicate an interaction between the starch and the divalent ion.

The catalytic activity of the liquid alpha-amylase appeared to be strongly enhanced by the addition of calcium chloride in amounts greater than that needed for simple activation of the enzyme. Another mechanism for enhancement of the alpha-amylase catalytic activity seems indicated.

EXAMPLE 8

Other inorganic salts were examined to see if they also enhanced the catalytic activity of alpha-amylase. The two chosen were sodium chloride, a neutral monovalent salt and magnesium chloride, a divalent acid salt capable of forming a hydrate.

Using the procedure set forth in Example 7, the following results were obtained.

TABLE 7

| Vessel | $MgSO_4$ | NaCl | Desize 160 | (Alpha-Amylase) % Hydrolysis |
|---|---|---|---|---|
| 1 | — | — | — | 0 |
| 2 | — | — | 0.5 ml | 10 |
| 3 | 0.5 gm | — | 0.5 ml | 30 |
| 4 | 1.0 gm | — | 0.5 ml | 30 |
| 5 | 2.0 gm | — | 0.5 ml | 70 |
| 6 | 4.0 gm | — | 0.5 ml | 90 |
| 7 | — | 0.5 gm | 0.5 ml | 50 |
| 8 | — | 1.0 gm | 0.5 ml | 90 |
| 9 | — | 2.0 gm | 0.5 ml | 90 |
| 10 | — | 4.0 gm | 0.5 ml | 100 |

EXAMPLE 9

As an alternative to using encapsulated or liquid enzymes, whole cells, either growing or resting, can be used as a source of enzymatic activity. For example, Sybron Corporation produces liquid suspensions of spores or vegetative cells for a variety of applications which have the capability of producing alpha-amylase and or protease.

Accordingly, uses of the Sybron spore and cell suspensions embedded in Gel-Coat (polyester resin) were examined. Calcium chloride was included in the epoxy resin mix since the reaction vessels were used to examine the activity of both alpha-amylase and protease in the same reactor. The enzymatic activities of alpha-amylase and protease were compared to the activities of the cell and spore suspensions.

The spore suspension used was Bio B+, available from Sybron Chemicals Inc, 111 Kesler Mill Road, Salem, Va. 25143, which contained the spore form of Bacillus polymyxa.

The cell suspension used was Bio P, available from Sybron Chemicals Inc, 111 Kesler Mill Road, Salem, Va. 25143, which included the vegetative form of the following microorganisms: *Bacillus subtilis, Pseudomonas aeruginosa, Pseudomonas putida, Pseudomonas fluoresens,* and *Escherichia hermanii.*

The sample vessels were prepared according to the methods of Example 1, and % hydrolysis for starch and milk solution was determined, again using the procedure of Example 1.

TABLE 8

| | % Milk Hydrolysis | % Starch Hydrolysis |
|---|---|---|
| 1 Bio P (cell suspension) | 100 | 0 |
| 2 Bio B+ (cell suspension) | 100 | 0 |
| 3 Desize 160 (alpha-amylase) | 0 | 90 |
| 4 Purafect 2000G (encapsulated protease) | 100 | 50 |
| 5 Maxamyl 15,000 (amylaytic enzyme) | 0 | 90 |
| 6 Milk Control | 0 | — |
| 7 Starch Control | — | 0 |

While alpha-amylase activity was not detected in this assay using either the spores or the vegetative cells, alternative cell or spore suspensions might well be expected to provide such activity.

The activity of the protease (Purafect 2000G) against starch suggested contamination of the enzyme with alpha-amylase.

EXAMPLE 10

Both encapsulated and liquid alpha-amylase embedded in a polyester resin and fiberglass material (Bondo, as described in Example 5, above) were examined for their ability to catalyze the hydrolysis of starch. Magnesium sulfate was added to both the encapsulated and liquid enzyme formulations. Each of the enzymes were added in a concentration that approximately normalized their activity.

The reaction vessels were prepared according to the procedure of Example 5 set forth in Table 9.

TABLE 9

| RX Vessel | MgSO$_4$ | (Liquid alpha-amylase) Desize 160 | Encapsulated Maxamyl 5000 (amylolytic enzyme) | Liquid Maxamyl 15,000 (amylolytic enzyme) |
|---|---|---|---|---|
| 1 | 5.0 gm | — | — | — |
| 2 | — | — | — | — |

TABLE 9-continued

| RX Vessel | MgSO$_4$ | (Liquid alpha-amylase) Desize 160 | Encapsulated Maxamyl 5000 (amylolytic enzyme) | Liquid Maxamyl 15,000 (amylolytic enzyme) |
|---|---|---|---|---|
| 3 | | 0.5 ml | — | — |
| 4 | | — | *2.0 gm | — |
| 5 | — | — | — | 0.5 ml |
| 6 | 5.0 gm | 0.5 ml | — | — |
| 7 | 5.0 gm | — | *2.0 gm | — |
| 8 | 5.0 gm | — | — | 0.5 ml |

*Added 0.1 ml H$_2$O before embedding in resin.

The vessels were allowed to harden overnight. 10 ml of water and 11.5 grams of starch were added to each vessel, and the mixture was stirred to homogeneity. The % hydrolysis after 60 minutes was determined according to the procedure of Example 1, with the results set forth in Table 10.

TABLE 10

| Sample | % Hydrolysis |
|---|---|
| 1 | 10 |
| 2 | 10 |
| 3 | 10 |
| 4 | 0 |
| 5 | 10 |
| 6 | 50 |
| 7 | 80 |
| 8 | 70 |

EXAMPLE 11

To explore the concept of using microorganisms to protect underwater surfaces from fouling by sea organisms, fiberglass plates were coated with a mixture of microorganisms embedded in several different coating materials, as set forth in Table 11. The preparatory procedure was as follows.

Twenty-one (21) panels made of fiberglass were hand sanded with 60 grit sand paper, wiped with xylene and paper towels to remove residue. Long panels have the following dimensions: 17⅞×5⅞×⅛" thick (454 mm×149 mm×3.2 mm), while short panels were 13⅞×5⅞×1/8" (352 mm×148× 3.2 mm) thick.

Microorganisms according to Table 11 below were added to the resin bases, and shaken by hand to blend. The units of the amounts listed in Table 11 are ounces times 100. Control panel "C" was not coated with a test composition.

Dura Shine is a liquid polymer, as disclosed in U.S. Pat. No. 5,073,407, and available from Howe Labs, Eden, N.Y. Turtle Wax Finish 2001 Liquid (Finish 2001) is a silicone resin with urethane available from Turtle Wax, Chicago, Ill. Glidden Latex is a nontoxic acrylic latex crib paint available from Glidden Paints, Jacksonville, Fla.

Bio B+, was obtained from Sybron Chemicals Inc, 111 Kesler Mill Road, Salem, Va. 25143; this mixture included the spore forms of *Bacillus polymyxa, Bacillus subtilis,* and *Bacillus lichenformis.*

Bio P, was also obtained from Sybron Chemicals Inc, 111 Kesler Mill Road, Salem, Va. 25143; it included the vegetative form of the following microorganisms: *Bacillus subtilis, Pseudomonas aeruginosa, Pseudomonas putida, Pseudomonas fluoresens,* and *Escherichia hermanii.*

The coating mixtures were then applied via synthetic paint brush by hand application with 2" brush made for poly paints. The panels were air dried for 24 hours and then a second coat was applied. The panels were air dried for 48 hours, wrapped in paper towels and carried to the marine test site.

TABLE 11

Protocol for Sea Experiment

| Plate # | Bio B+ (spare Mixture) | Bio P (micro-organisms) | Dura Shine (Liquid polyme) | Finish 2001 (silicone resin) | Glidden Latex (Acrylic latex paint) |
|---|---|---|---|---|---|
| 1 | *25 | 25 | 200 | — | |
| 2 | — | 50 | 200 | — | |
| 3 | 50 | — | 200 | — | |
| 4 | 25 | 25 | — | 200 | |
| 5 | — | 50 | — | 200 | |
| 6 | 50 | — | — | 200 | |
| 7 | 25 | 25 | — | — | 200 |
| 8 | — | 50 | — | — | 200 |
| 9 | 50 | — | — | — | 200 |
| 10 | 50 | 50 | 100 | — | 100 |

*Ounce times 100

Upon arrival the panels were attached to PVC racks and suspended in a marine environment from a floating barge to allow continuous immersion in sea water with adequate tidal flow. The plates were immersed in sea water at two different levels (upper tier =at water line, lower tier =completely submerged) for a period of four months. The amounts of algae which accumulated after each month were measured and recorded in Table 12.

TABLE 12

Algae % Coverage

Plate Number

| | 1 | 2 | 3 | 4 | 5 | 6 | 7 | 8 | 9 | 10 | C* |
|---|---|---|---|---|---|---|---|---|---|---|---|
| | | | | | Upper Tier | | | | | | |
| Jan. | 20 | 50 | 30 | 60 | 25 | 25 | 30 | 35 | 30 | 35 | 40 |
| Feb. | 15 | 25 | 20 | 40 | 15 | 15 | 30 | 30 | 30 | 35 | 35 |
| Mar. | 12 | 20 | 12 | 15 | 7 | 7 | 35 | 30 | 25 | 35 | 35 |
| Apr. | 3 | 3 | 2 | 2 | 1 | 1 | 35 | 35 | 25 | 40 | 30 |
| | | | | | Lower Tier | | | | | | |
| Jan. | 3 | 2 | 1 | 70 | 65 | 70 | 40 | 25 | 10 | 15 | 10 |
| Feb. | 3 | 2 | 2 | 45 | 40 | 45 | 35 | 30 | 15 | 20 | 15 |
| Mar. | 4 | 3 | 3 | 20 | 25 | 30 | 40 | 35 | 30 | 20 | 25 |
| Apr. | 5 | 5 | 5 | 7 | 2 | 5 | 45 | 40 | 35 | 30 | 30 |

*= control plate (untreated)

Figure 2:
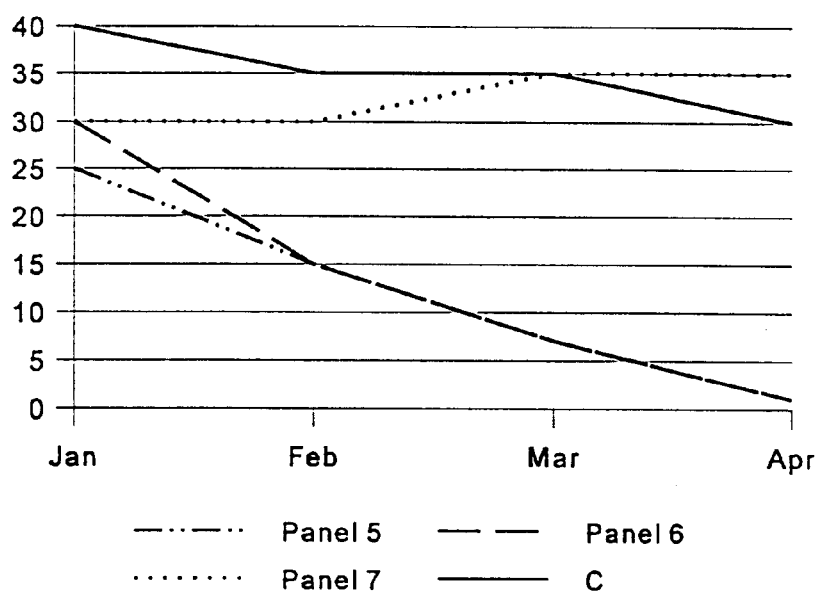
FIG. 2. is a plot of test results for upper tier panels 5–7 and control having coatings according to the invention.
Figure 3:
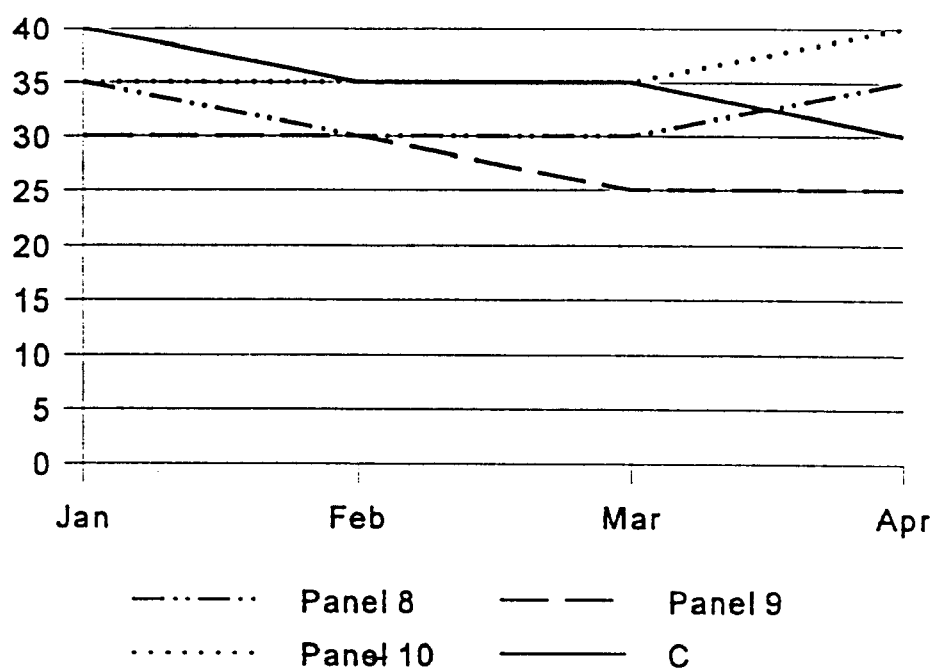
FIG. 3. is a plot of test results for upper tier panels 8–10 and control having coatings according to the invention.
Figure 4:
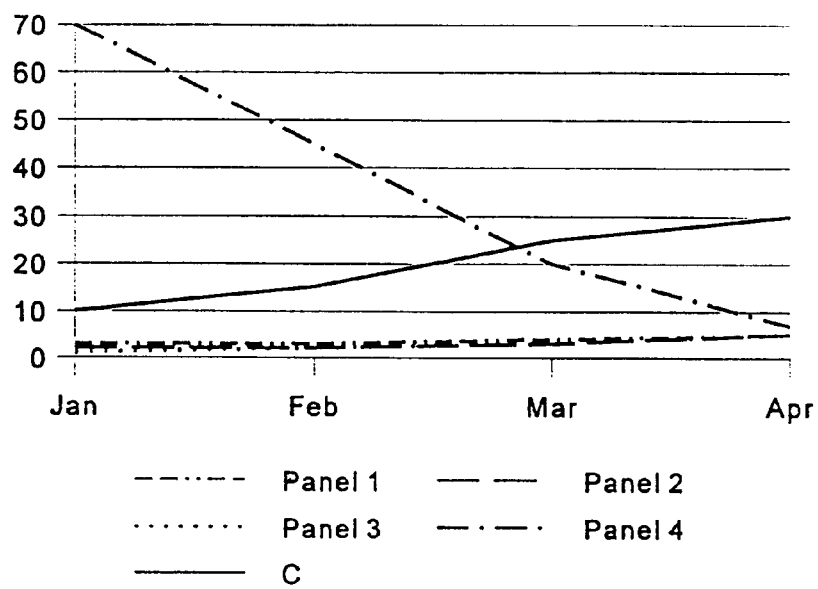
FIG. 4. is a plot of test results for lower tier panels 1–4 and control having coatings according to the invention.
Figure 5:
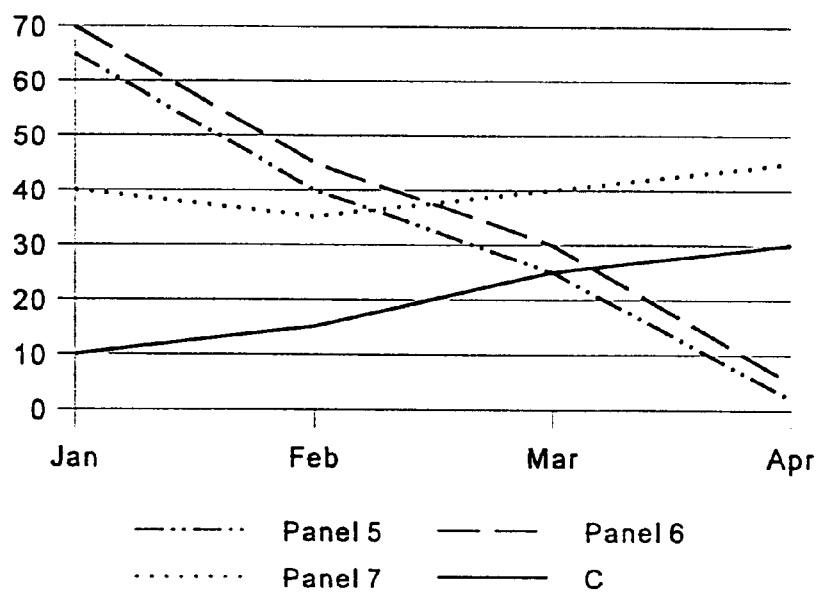
FIG. 5. is a plot of test results for lower tier panels 5–7 and control having coatings according to the invention.
Figure 6:
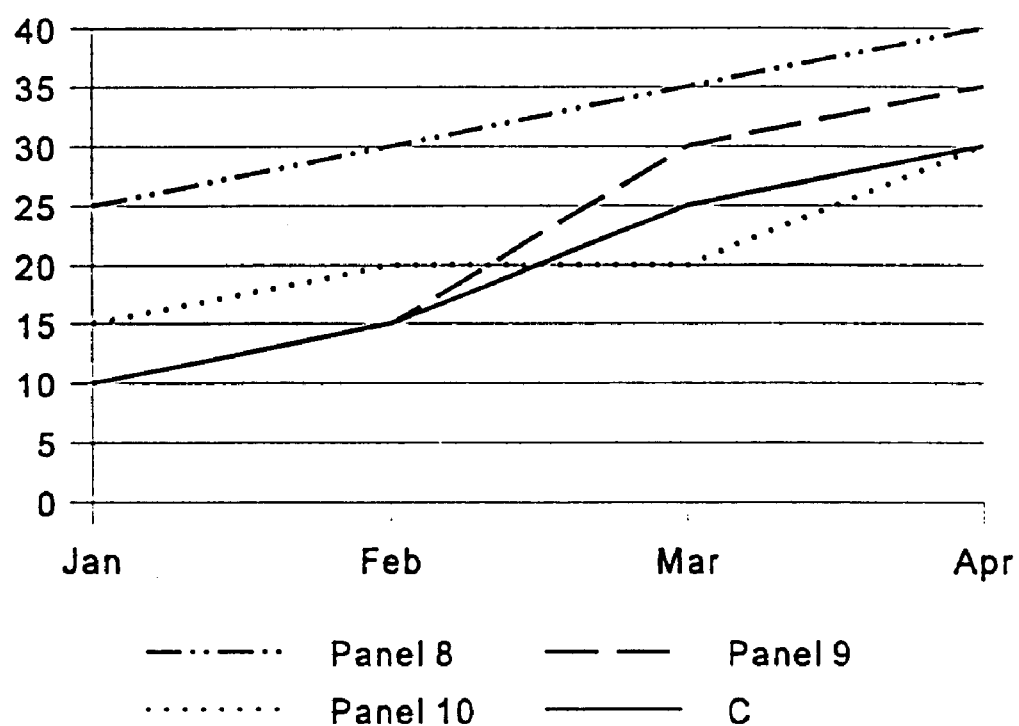
FIG. 6. is a plot of test results for lower tier panels 8–10 and control having coatings according to the invention.

Table 12 lists the percentage of panel area that was fouled by algae by month (Jan.–Apr.) and by panel (1–10 and Control) for the upper tier racks and the lower tier racks. The results are also plotted in FIG. 1–FIG. 6.

These results demonstrate that it is possible to achieve and maintain antifouling characteristics in a coating by selection of proper microorganisms. For example, the Dura Shine (liquid polymer) coating had an average algae fouled area of 2.67% in the upper tier versus a control of 30%. The Finish 2001 (silicone resin) coating had an average algae fouled area of 1.33% in the upper tier versus a control of 30%.

Tables 13 and 14 list the percentage of the area that was fouled by encrusted Bryazoan, a representative of the hard growth fouling community, after the four month immersion period. Bryazoan growth was inhibited from 33 to 1 00% by the application of the microbially loaded coatings. In addition, a dark green biofilm was observed to develop on the plates. This biofilm is believed to reflect an underlying microbial film that protects against soft and hard growth. This is consistent with the observatin that the most effective coating formulations, Dura shine (liquid polymer) and Finish 2001 (silicone resin), had the greatest percentage area covered by the biofilm—a manifestation of the growth of the added protective microbial community suspended in the coating.

TABLE 13

UPPER TIER - FOUR MONTHS

| Plate # | % Encrusted Bryazoan | % Biofilm |
|---|---|---|
| 1 | 1 | 80 |
| 2 | 1 | 70 |
| 3 | 1 | 85 |
| 4 | 0 | 75 |
| 5 | 1 | 65 |
| 6 | 0 | 75 |
| 7 | 1 | 55 |
| 8 | 3 | 55 |
| 9 | 2 | 65 |
| 10 | 5 | 25 |
| C | 5 | 55 |

TABLE 14

LOWER TIER - FOUR MONTHS

| Plate # | % Encrusted Bryazoan | % Biofilm |
|---|---|---|
| 1 | 3 | 85 |
| 2 | 1 | 75 |
| 3 | 3 | 80 |
| 4 | 3 | 85 |
| 5 | 2 | 65 |
| 6 | 3 | 75 |
| 7 | 5 | 35 |
| 8 | 5 | 40 |
| 9 | 7 | 40 |
| 10 | 12 | 25 |
| C | 7 | 55 |

Tables 15 and 16 list the percentage of total (soft & hard growth) panel area that remained unfolded when the plates were inspected. The data is listed by mouth (Jan–Apr) and by panel (1–10 and Control) for the upper tier racks and the lower tier racks.

TABLE 15

Upper Tier

Plate Number

| | 1 | 2 | 3 | 4 | 5 | 6 | 7 | 8 | 9 | 10 | C* |
|---|---|---|---|---|---|---|---|---|---|---|---|
| Jan. | 77 | 45 | 65 | 38 | 74 | 69 | 68 | 63 | 67 | 55 | 48 |
| Feb. | 82 | 69 | 75 | 58 | 84 | 83 | 67 | 66 | 64 | 51 | 52 |
| Mar. | 82 | 70 | 79 | 81 | 90 | 90 | 61 | 64 | 69 | 47 | 53 |
| Apr. | 91 | 84 | 86 | 93 | 95 | 96 | 58 | 55 | 66 | 29 | 59 |

TABLE 16

Lower Tier

Plate Number

|  | 1 | 2 | 3 | 4 | 5 | 6 | 7 | 8 | 9 | 10 | C* |
|---|---|---|---|---|---|---|---|---|---|---|---|
| Jan. | 77 | 73 | 89 | 28 | 30 | 28 | 45 | 50 | 70 | 75 | 65 |
| Feb. | 80 | 80 | 89 | 52 | 54 | 53 | 51 | 66 | 66 | 63 | 68 |
| Mar. | 82 | 82 | 87 | 76 | 69 | 67 | 43 | 61 | 51 | 54 | 62 |
| Apr. | 86 | 89 | 84 | 86 | 91 | 89 | 35 | 42 | 47 | 28 | 56 |

Again, these results show that it is possible to achieve significantly better performance against fouling using compositions and/or paints according to the invention versus an untreated control.

EXAMPLE 12

The effectiveness of the invention against hard growth was tested in a polyurethane resin mixture. The test mixtures contained various combinations of spores, enzymes and vegetative cells. The procedure used was as follows.

Panels were prepared according to the procedure of Example 11. The panels were then divided lengthwise using plastic tape to provide two test surfaces per panel. The coating mixtures were prepared using 4 oz. of polyurethane resin (available as Polyurethane Clear Gloss No. 603, from Behr Process Corp., Santa Ana, Calif.) and adding 0.25 oz. each of spores, vegetative cells, and/or enzymes as indicated below in Table 17. The mixtures were then hand mixed and hand applied to the panels as indicated in Table 17. The spores, vegetative cells, and/or enzymes used were those used in Example 11.

TABLE 17

|  | # Barnacles | Plate # | Bio P micro-organisms) | Bio B+ (spore mixture) | alpha Amylase | Protease |
|---|---|---|---|---|---|---|
|  | 49 | Control | — | — | — | — |
|  | 45 | 3A | — | — | — | 0.25 |
| ✓ | 38 | 3B | — | — | 0.25 | 0.25 |
| ✓ | 37 | 4A | 0.25 | — | 0.25 | 0.25 |
| ✓ | 38 | 4B | 0.25 | 0.25 | 0.25 | 0.25 |
|  | 46 | 5A | — | 0.25 | — | — |
|  | 51 | 5B | 0.25 | 0.25 | — | — |
| ✓ | 28 | 6A | 0.25 | — | — | — |
| ✓ | 27 | 6B | — | — | 0.25 | — |
| ✓ | 38 | 7A | 0.25 | 0.25 | 0.25 | — |
| ✓ | 37 | 7B | 0.25 | 0.25 | — | 0.25 |

✓ = Most effective mixtures

Amounts of spores, vegetative cells, and/or enzymes indicated in ounces.

After the coatings were applied, the panels were suspended from a PVC pipe rack for a minimum of 24 hours to air dry. The finished panels were then carried to the test facility. At the facility the panels were attached to PVC pipe frames. The attachment technique utilized plastic tie backs to suspend the panels, at their corners, from the framework of the PVC. After all the panels were attached to the PVC frames, the frames were suspended in the water so that the horizonal rows of panels were approximately 6 inches below the surface of the water. The PVC frames were tied off and suspended from a floating pier. Therefore the panels maintained their same relative position in the water throughout the experiment.

The panels were submerged for three months. Once a week for the first month, the panels were exposed to a slow stream of water which approximated the velocity of a vessel at three knots. At no time were the panels allowed to dry. After the exposure, the PVC pipe frames were suspended at their original depth in the water.

The test concluded after four months. At the end of the first month, the number of barnacles, mussels, oysters, bugula, and grass growth was documented. The area counted was restricted to a 3" square from the top of the test panel. The results are given in Table 17 above. The data demonstrate the average number of barnacles in the test area was 38.5 and the average in the control area was 49. This represents a reduction of 21 percent and demonstrates the utility of the invention to inhibit hard growth. The grass and bugula covered approximately forty percent of the test area. Over the next three months, the growth in the test area remained essentially the same while the control area continued to experience growth even to a thickness of three-eighths of an inch over one hundred percent of the surface; it was layered growth. Moreover the soft growth in the test area continued to decrease over time and at the conclusion of the test only ten percent of the area had any soft growth. Again this strongly demonstrates the utility of the invention to inhibit both soft and hard growth.

EXAMPLE 13

A further demonstration of the invention was explored according to the following Example. In this example, two liquid polymers were examined as alternatives to using epoxy resins as embedding agents for catalytically active cells and enzymes.

The test coatings were shaken by hand to blend. The ingredients for each coating mixture are given below in Table 18 (measurements listed were in units of grams). Finish 2001 (silicone resin), Dura Shine (liquid polymer), Bio B+ (spore mixture), and Bio P (microorganisms) were the materials as described in Example 11. The protease used was Purafect 4000L, as described in Example 6.

The coating mixtures were applied to 1×1½ inch sections of wooden blades and air dried for sixty minutes. At this point, the coated wooden blades were washed under running water to remove unadhered coating. The coated blades were submerged in 25 ml of a 1:4 dilution of skim milk for two hours. The percent hydrolysis was determined according to the method of Example 1. The results are given in Table 18, below.

TABLE 18

| Sample | Finish 2001* (silicone resin) | Dura-Shine* (liquid polymer) | Protease* | Bio B+* (spore mixture) | Bio P* (microorganisms) | % Hyd. |
|---|---|---|---|---|---|---|
| 1 | 4.8 | 0 | 0.56 | 0 | 0 | 70 |
| 2 | 4.8 | 0 | 0 | 0.56 | 0 | 20 |
| 3 | 4.8 | 0 | 0 | 0 | 0.56 | 0 |

TABLE 18-continued

| Sample | Finish 2001* (silicone resin) | Dura-Shine* (liquid polymer) | Protease* | Bio B+* (spore mixture) | Bio P* (microorganisms) | % Hyd. |
|---|---|---|---|---|---|---|
| 4 | 4.8 | 0 | 0.56 | 0.56 | 0 | 70 |
| 5 | 4.8 | 0 | 0.56 | 0 | 0.56 | 50 |
| 6 | 0 | 4.8 | 0.56 | 0 | 0 | 50 |
| 7 | 0 | 4.8 | 0 | 0.56 | 0 | 0 |
| 8 | 0 | 4.8 | 0 | 0 | 0.56 | 10 |
| 9 | 0 | 4.8 | 0.56 | 0.56 | 0 | 60 |
| 10 | 0 | 4.8 | 0.56 | 0 | 0.56 | 80 |
| 11 | 4.8 | 0 | 0 | 0 | 0 | 0 |
| 12 | 0 | 4.8 | 0 | 0 | 0 | 0 |

*= measurements in units of grams

It will be apparent to those skilled in the art that various modifications and variations can be made in the methods and compositions of the present invention without departing from the spirit of scope of the invention. Thus, it is intended that the present invention cover the modifications and variations of this invention provided they come within the scope of the appended claims and their equivalents.

What is claimed is:

1. A method for removing undesired growth from a surface, comprising the step of coating the surface with a composition comprising
   a polymer resin base material, and
   at least one microorganism capable of producing at least one amylolytic or proteolytic enzyme, wherein the microorganism and enzyme are present in an amount effective to remove undesired growth from the surface.

2. The method of claim 1, wherein the polymer resin base material is selected from the group consisting of an epoxy material, a polyurethane material, a polyester material, a fiberglass material, a silicone material and an acrylic material.

3. The method of claim 1, wherein the composition further comprises an inorganic salt present in a catalytically effective amount.

4. The method of claim 1, wherein the composition further comprises at least one amylolytic or proteolytic enzyme.

5. The method of claim 1, wherein the microorganism also produces a surfactant that acts as a wetting agent.

6. The method of claim 1, wherein the growth is soft growth.

7. The method of claim 1, wherein the growth is hard growth.

8. The method of claim 1, wherein the enzyme attacks exudates of existing growths and causes release of hard and soft growth.

9. The method of claim 1, wherein the surface is a floor, roof or shingle.

10. A method for removing undesirable growth from a surface, comprising the step of coating the surface with a paint composition comprising
    a paint base material,
    a pigment, and
    at least one microorganism capable of producing at least one amylolytic or proteolytic enzyme, wherein the microorganism and enzyme are present in an amount effective to remove undesired growth from the surface.

11. The method of claim 10, wherein the paint base material is a polymer.

12. The method of claim 10, wherein the paint base material is selected from the group consisting of an epoxy material, a polyurethane material, a polyester material, a fiberglass material, a silicone material and an acrylic material.

13. The method of claim 10, wherein the composition further comprises an inorganic salt present in a catalytically effective amount.

14. The method of claim 10, wherein the composition further comprises at least one amylolytic or proteolytic enzyme.

15. The method of claim 10, wherein the microorganism also produces a surfactant that acts as a wetting agent.

16. The method of claim 10, wherein the growth is soft growth.

17. The method of claim 10, wherein the growth is hard growth.

18. The method of claim 10, wherein the enzyme attacks exudates of existing growths and causes release of hard and soft growth.

19. The method of claim 10, wherein the surface is a floor, roof or shingle.

* * * * *